Nov. 4, 1969  J. R. LAWLER  3,475,937

ROLL FORMING APPARATUS

Filed Aug. 1, 1966  8 Sheets-Sheet 1

James R. Lawler
INVENTOR.

BY James F Weiler
William A Stout
Paul L DeKerta II
Dudley R Dobie, Jr.
ATTORNEYS Nov. 4, 1969   J. R. LAWLER   3,475,937
ROLL FORMING APPARATUS
Filed Aug. 1, 1966   8 Sheets-Sheet 3

James R. Lawler
INVENTOR.
BY
ATTORNEYS

United States Patent Office 3,475,937
Patented Nov. 4, 1969

3,475,937
ROLL FORMING APPARATUS
James R. Lawler, 3102 Dunvale, Houston, Tex. 77042
Filed Aug. 1, 1966, Ser. No. 569,404
Int. Cl. B21d 5/08; B21b 27/10
U.S. Cl. 72—181                       4 Claims

ABSTRACT OF THE DISCLOSURE

A roll forming apparatus uniquely suited for high temperature use such as in a furnace and having a series of roll formers for shaping a metal strip, each said roll former having first and second shafts wherein each shaft includes a plurality of releasably mounted roll segments. At least one segment on one shaft is provided with a projection to coact with a recess on a roll segment of the other shaft.

---

The present invention relates to improved roll forming apparatus by which metal strips may be formed into various structural shapes, for example, titonium alloy strips, into structural configurations such as Zs, Cs, Us, channels and the like.

It would be highly desirable to provide a roll forming apparatus and roll formers in which metal alloy strips are formed into structural configurations, such as Zs, Cs, Us and the like, and in which the parts of the roll formers may be removed, and in some instances simply removed and reversed, or replaced, so that Cs, Zs, Us and channels, as well as various sizes thereof, may be made by making minor adjustment and changes in the roll former thereby eliminating the necessity of having separate roll formers for each of the structural configurations or sizes of them. It would also be highly desirable to provide such roll formers which can be used in relatively high temperature ovens for forming metal alloy strips into these structural shapes, for example, titanium alloy strips, of relatively tight bend radii with metallurgical integrity of the formed parts. The present invention is directed to such roll formers and roll forming apparatus.

It is therefore an object of the present invention to provide roll formers and apparatus for forming strip material into structural configuration in which rearrangement of the roll former segments or by replacement of some of them various structural configurations and shapes can be made, such as Cs, Zs, Us, channels and the like.

A further object of the present invention is the provision of roll formers which include roll former segments releasably mounted on roll support shafts, the combined work surfaces of which form structural configuration forming surfaces and by rearrangement or reversal of some of the segments the structural configuration forming surface can be changed from Zs to Cs, Us, channels and the like.

A further object of the present invention is the provision of such a roll forming apparatus in which metal alloy strips may be formed into structural configurations having relatively tight bend radii and metallurgical integrity of the formed parts.

Yet a further object of the present invention is the provision of a roll forming apparatus for forming metal alloy strips into structural configurations of tight bend radii in which the formed structural configurations are within close tolerances and in which a bend radii as tight as two times the thickness of the metal strips can be maintained, if desired.

Yet a further object of the present invention is the provision of a roll forming apparatus and roll formers in which a minimum amount of heat is transferred from the heated strip metals to the roll formers and maximum cooling thereof is provided.

Other and further objects, features and advantages of the invention will be apparent from the following description of presently-preferred embodiments thereof, given for the purpose of disclosure, and taken in conjunction with the accompanying drawings, and where.

Figures 1, 2A:
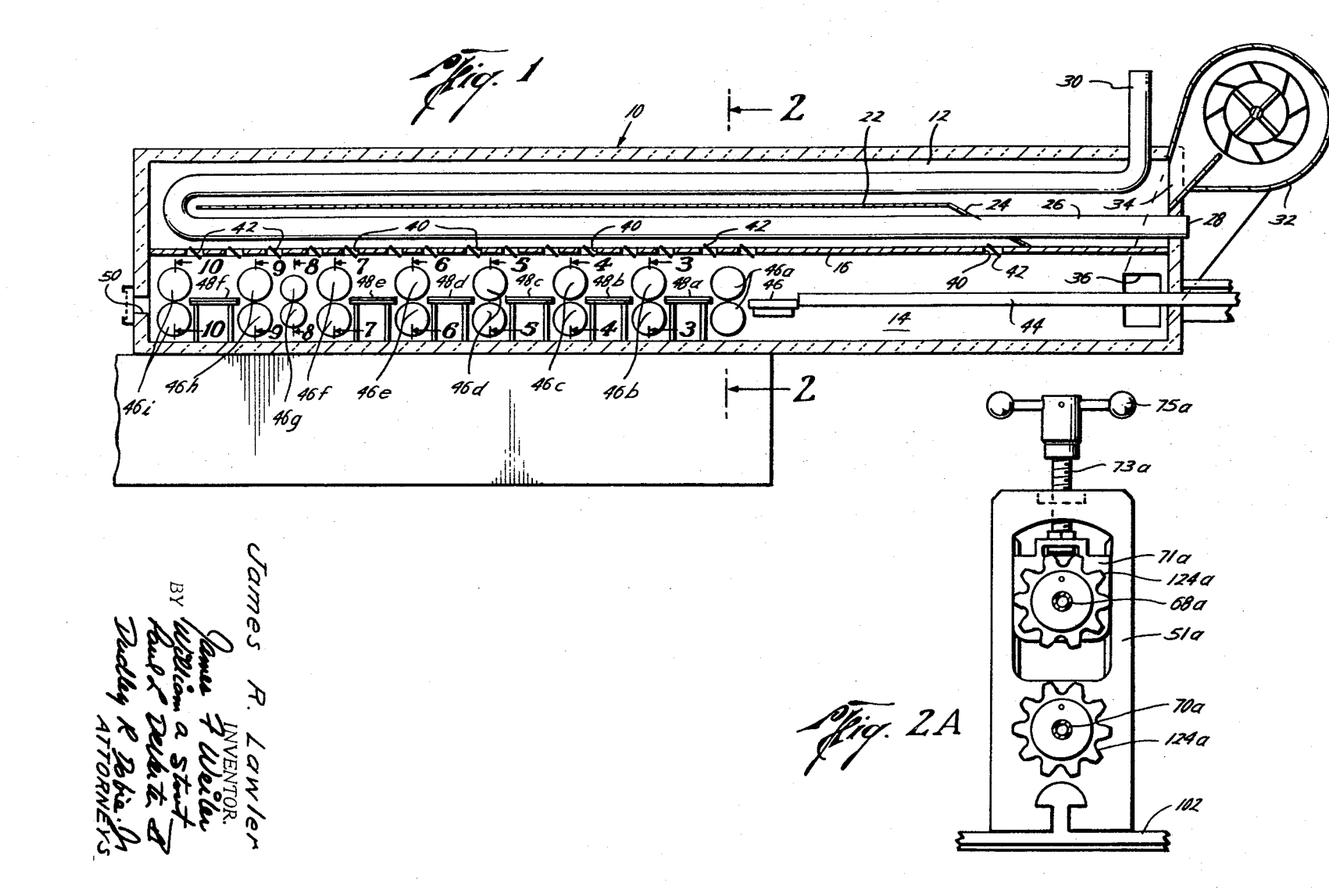
FIGURE 1 is a side view, in elevation, of a roll forming apparatus according to the invention disposed within a furnace.
FIGURE 2a is a sectional view taken along the line 2a—2a of FIGURE 2.

Referring now to the drawings, and particularly to FIGURE 1, roll forming apparatus is illustrated and shown in a furnace or oven generally designated by the reference numeral 10. The oven 10 is divided into the fire tube compartment 12 and a structural configuration compartment 14 by means of the partition 16 extending across and along its length. The fire tube compartment is further divided into substantially a pair of compartments 18 and 20 by means of the partition 22 which extends substantially the length of and across the fire tube compartment 12. The partition 22 has a downwardly and angularly extending partition member 24 adjacent its right end, as the drawing is viewed, which extends downwardly and engages the partition 16.

A fire tube 26 is provided into the inlet end 26 into which is provided products of combustion, not shown, which go through the fire tube 26 and exhaust out the stack 30.

A circulation type fan 32 is provided and circulates a suitable gas, such as air, into the opening 34 in the fire tube chamber and around the fire tube and out the exhaust 36 back to the fan 32.

Disposed along the length of the partition 16 are a plurality of openings 40 into which are provided the adjustable baffles 42 by which the circulation and flow of the heated air into the structural configuration chamber 14 is provided.

No more details of the particular furnace arrangement are given or deemed necessary as the roll forming apparatus and roll formers may be utilized in connection with a furnace or in rolling strip material not in a furnace. The particular furnace disclosed, however, is particularly advantageous for forming strips of metal alloy into structural configurations with a minimum or elimination of hydrogen embrittlement and elimination of excessive scaling at elevated temperatures and is disclosed in my copending application, Ser. No. 469,403, filed concurrently with this application.

Still with reference to FIGURE 1, a guide strip 44 is provided for entry of strip material to be formed into structural configurations by the plurality of pairs of roll formers designated by the reference numerals 46a–i, inclusive.

Disposed at and aligned with the inner end of the guide member 44 is a guide support 46 which guides the strip material between the first pair of roll formers 46a. Disposed between each of the pairs of roll formers 46a–i, except between roll formers 46f–h, are the work support and guide members 48a–f, inclusive. These members support the strip material and guide it from one pair of rollers to the next. Between the pairs of rollers 46f and 46h, however, is provided the idler roll formers 46g.

An outlet 50 is provided in the structural configuration forming furnaces 14 for discharge of work which has been progressively formed into a desired structural configuration by the pairs of roll formers 46a–i, inclusive.

Figure 2:
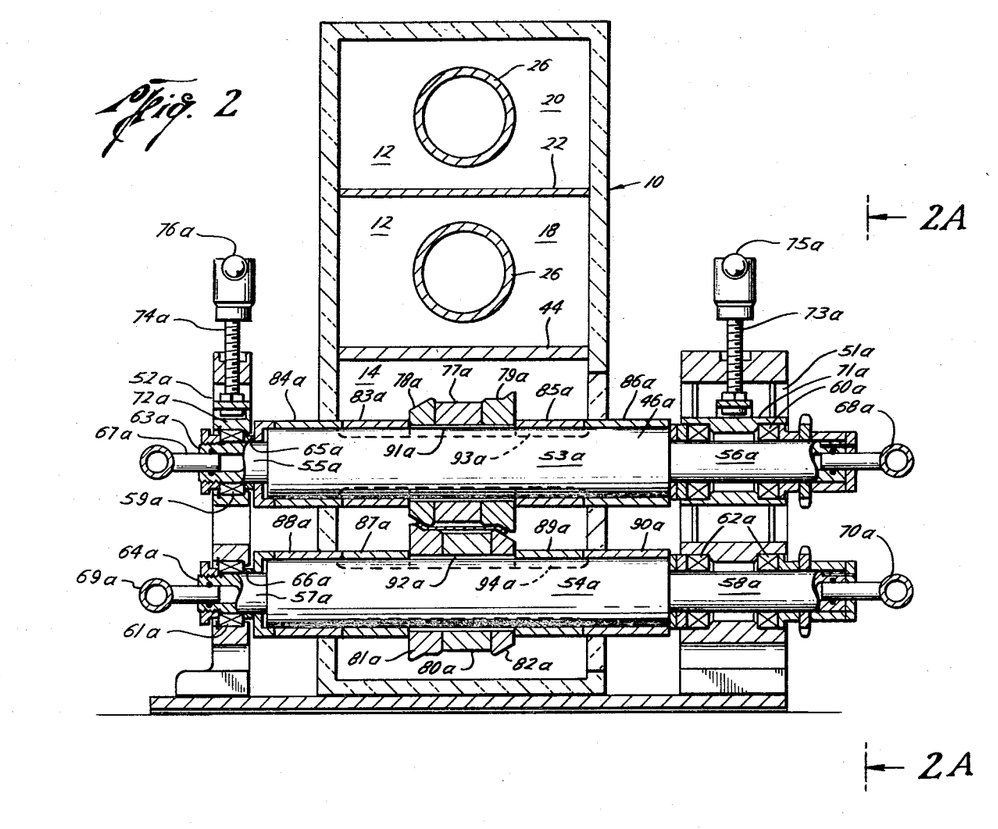
FIGURE 2 is a sectional view taken along the line 2—2 of FIGURE 1.

Referring now to FIGURE 2, the pairs of roll formers are suitably supported in bearing stands, 51a and 52a. The upper roll supporting shaft 53a and the lower roll supporting shaft 54a are each reduced in diameter at their ends, thus the upper shaft 53a is reduced at its ends 55a and 56a and the lower roll support shaft 54a is reduced at its ends 57a and 58a. The reduced diameter portions 55a–58a, inclusive, are received in bearing assemblies indicated by the reference numerals 59a, 60a, 61a and 62a, as illustrated. Thus, the upper roll support shaft 53a and lower roll support shaft 54a are rotatably journalled within the bearing stands 51a and 52a.

At one end of each of the shafts there are provided the nuts 63a and 64a which are threadedly received in the bearing stand such as at 52a as illustrated, and by tightening these nuts, the bearings 59a and 61a are tightened against the packings 65a and 66a, respectively, which maintain the segments of the roll formers in position, as presently described.

Each of the roll support shafts 53a and 54a are hollow through which circulation of cooling fluid can be accomplished when the roll formers are utilized in an oven and, to this end, cooling fluid circulation pipes 67a and 68a are provided for the upper roll support shaft 63a and circulated pipes 69a and 70a are provided adjacent each end of the lower roll support shaft 54a so that a cooling fluid, from a source not shown, may be circulated through the shafts to maintain them cooled as well as the segments of the roll formers.

It is noted that the lower work support shaft 54a is not adjustable, but a micrometer adjustment is provided for the upper roll support shaft 53a. To this end, the reduced diameter portions 55a and 56a are mounted in the slides 71a and 72a which are slidable in a vertical direction in the bearing stands 51a and 52a, respectively, and which are adjusted by means of the micrometer screws 73a and 74a by rotating the handles 75a and 76a, respectively. Thus, adjustment of the micrometer screws 73a and 74a moves the upper roll support shaft 53a away from and toward the lower roll support shaft 54a a measured distance.

The remaining pairs of rolls 46d–i are similarly supported, and where illustrated, corresponding reference letters are applied to the numerals designating them.

The roll formers are generally made in segments and are removably disposed on the roll support shafts. Still with reference to FIGURE 2, the roll former on the upper shaft 53a is provided in three separate segments, a central segment 77a, and two outer segments 78a and 79a. Similarly, the roll former on the lower roll support shaft 54a is formed in three segments with a generally central member 80a and the outer members 81a and 82a which have matching work forming or configuration shaping surfaces to those of 77a, 78a, and 79a, respectively.

The segments of the roll formers are held together adjacent one another in a central position by means of the generally tubular spacers 83a, 84a, 85a, 86a, 87a, 88a, 89a and 90a which slide over the roll support shaft 53a and 54a, as illustrated, and by tightening the nuts 63a and 64a, as previously mentioned, the roll former segments are securely held in a centralized position on the roll support shafts 53a and 54a.

The segments of the roll formers are nonrotatably mounted on the roll support shafts 53a and 54a by means of the keys 91a and 92a disposed in the slots 93a and 94a in the support shaft 53a and the lower roll support shaft 54a, respectively. Thus, the combined work surface of each of the roll former segments form the strip materials into the desired structural configuration.

Thus, by unthreading the nuts 63a and 64a, the upper and lower support shafts 53a and 54a may be removed from the bearings, the spacers 83a–90a, inclusive can be removed and any of the segments 78a–82a of the roll formers can be removed or replaced to either change the structural configuration of the strip being worked or to change the dimensions by putting in wider or narrower segments and the like.

The roll formers illustrated in the drawings are for forming structural configurations of strip material in the form of a Z. In general, these roll formers progressively form the strip material into the final structural configuration of a Z.

In general, the work shaping or structure forming surface of the combined roll former segments are illustrated in FIGURES 2b, 3, 4, 5, 6, 7, 8, 9 and 10. For convenience of reference, in these figures letters a through i have been added to the reference numerals for these various parts for each pair of rolls and their parts corresponding to the lettering of the pairs of rolls in FIGURE 1.

Figure 2B:
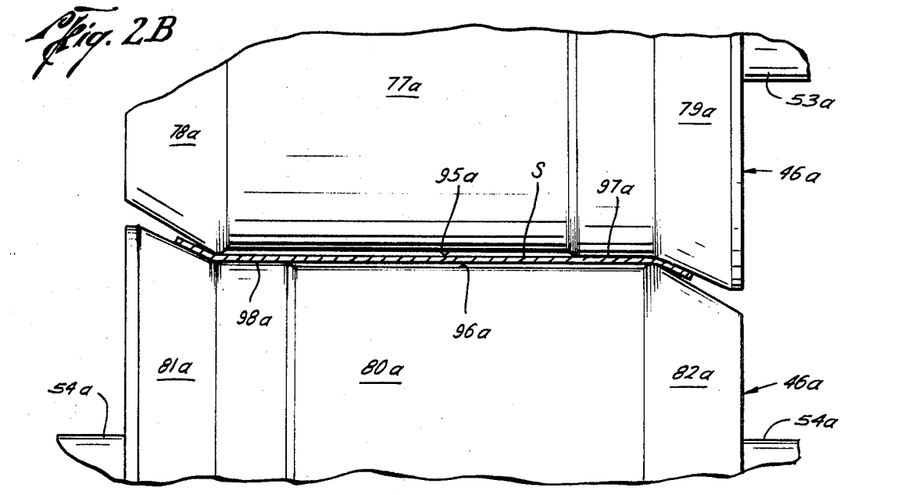
FIGURE 2b is an enlarged fragmentary view of the pair of roll formers illustrated in FIGURE 2.

Referring now to FIGURE 2b, the pair of work forming rolls 46a have the generally flat central portions 77a and 80a which are generally parallel to the axes of the work support shafts, not shown in this view, and have end segments 78a and 79a and 81a and 82a, respectively, which make an initial bend of the ends of the metal alloy strip S. The strip S then progresses to the next pair of roll formers 46b illustrated in FIGURE 3 where a further bend of the outer ends of the strip S is made.

Figure 3:
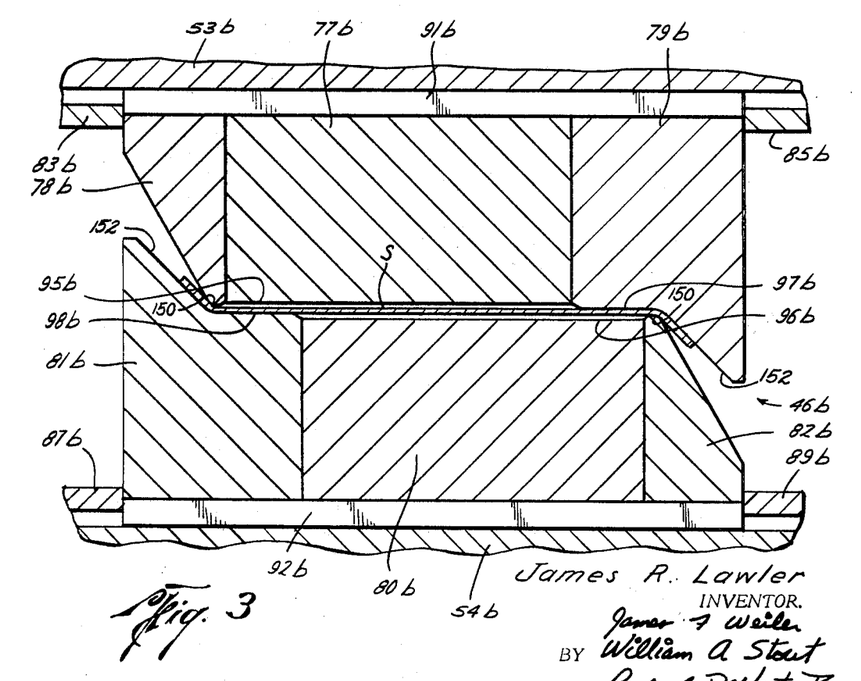
FIGURE 3 is an enlarged, sectional view, similar to FIGURE 2b, illustrating a pair of roll formers making a progressively greater bend of the metal strips than in FIGURE 2b.
Figure 4:
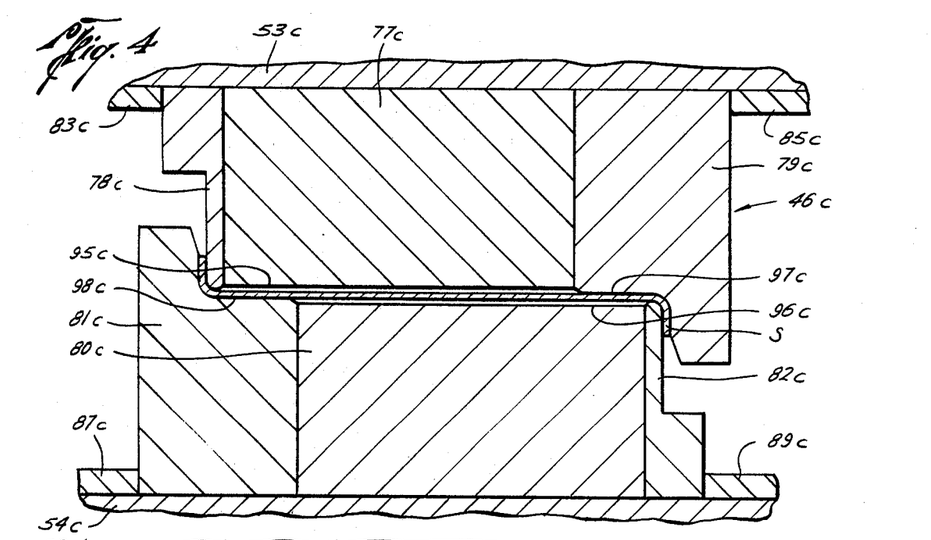
FIGURE 4 is a fragmentary view of a pair of roll formers similar to FIGURE 3 but illustrating a still further bending of the metal strip.
Figure 5:
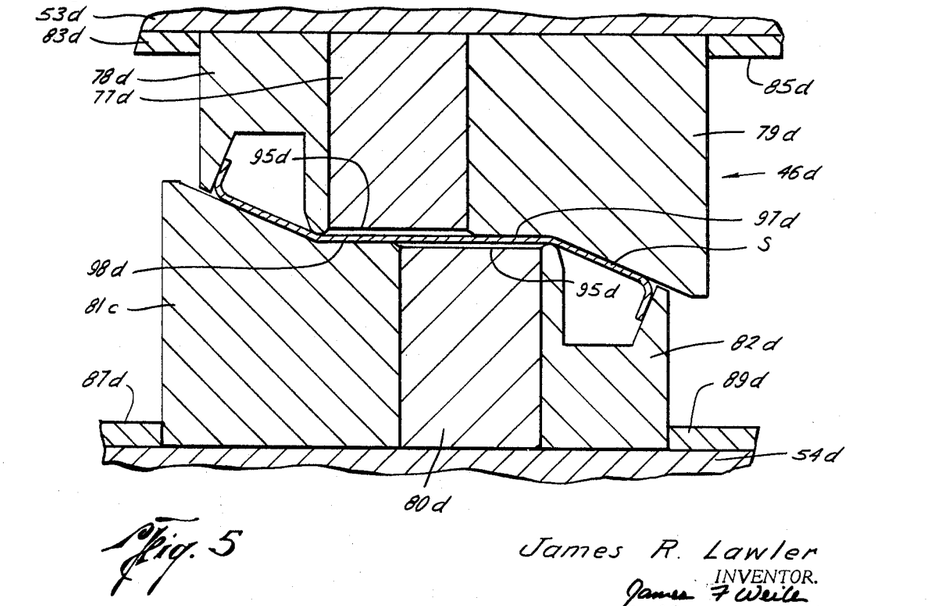
FIGURE 5 is a fragmentary view of a pair of roll formers similar to FIGURE 4 illustrating a still further bending of the metal strip.
Figure 6:
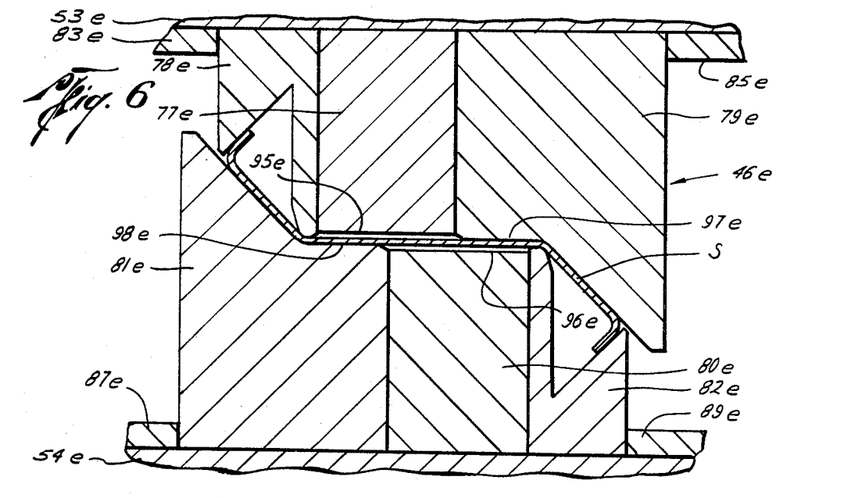
FIGURE 6 is a fragmentary view of a pair of roll formers similar to FIGURE 5 illustrating a still further bending of the metal strip.
Figure 7:
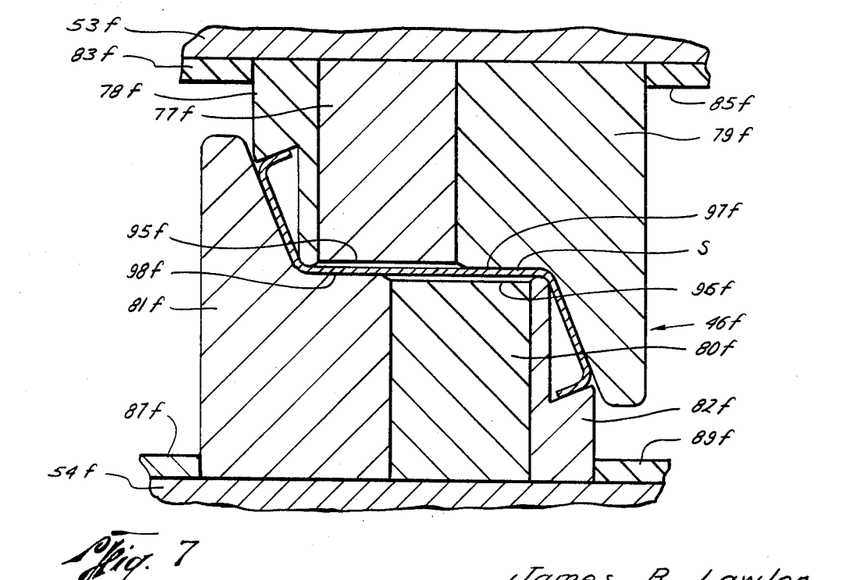
FIGURE 7 is a fragmentary view of a pair of roll formers similar to FIGURE 6 illustrating a further bending of the metal strip.
Figures 8, 8A:
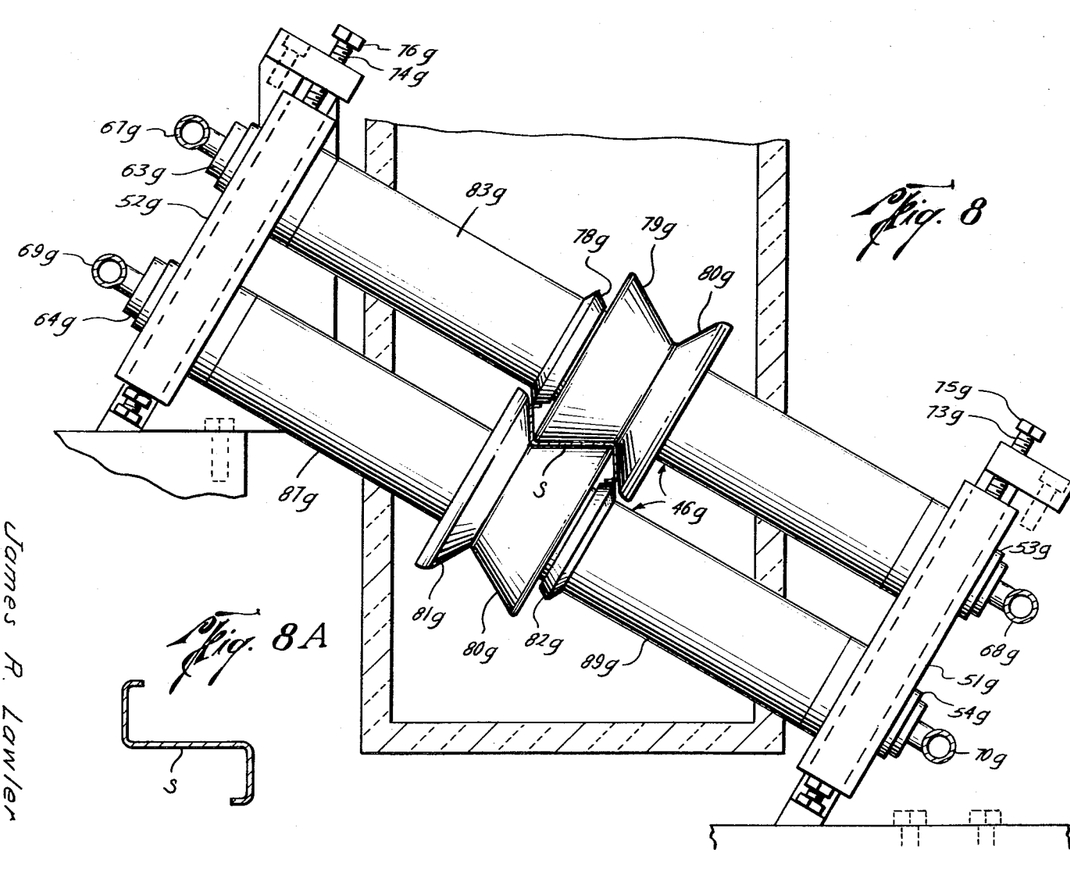
FIGURE 8 is a side elevational view illustrating a pair of roll formers making a still further bending of the metal strip.
FIGURE 8A is a sectional view of the metal strip in the shape bent by the roll formers of FIGURE 8.
Figure 9:
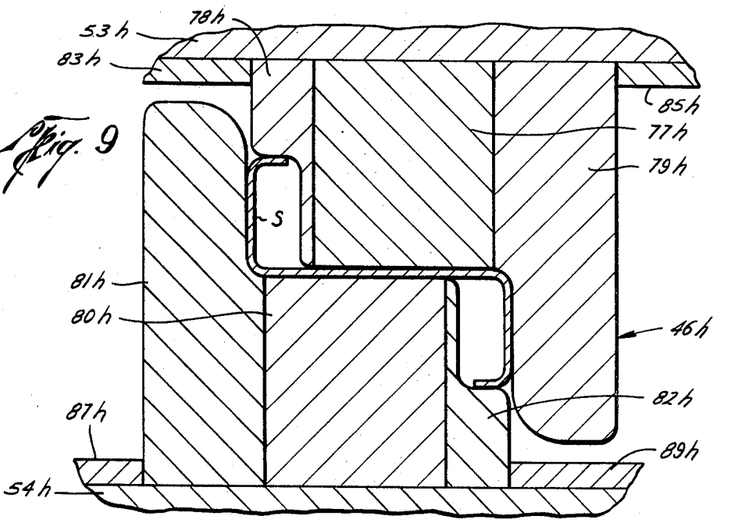
FIGURE 9 is an enlarged sectional view of roll formers making a still further bending of the metal strip.
Figure 10:
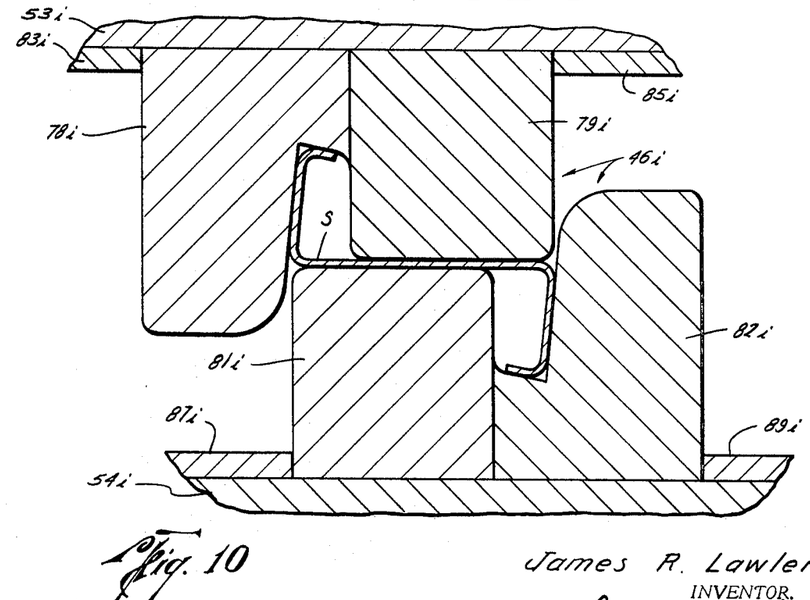
FIGURE 10 is a fragmentary view of a pair of roll formers similar to that of FIGURE 9 making a still further bend of the metal strip.

As best seen in FIGURE 3, the end segments 78b and 82b each have a radial, annular projection tapering to an apex 150. The end segments 79b and 81b also each have a radial, outwardly facing annular recess 152 tapering to a flat innermost bearing surface 97b and 98b respectively. It should be noted that the metal strip S is contacted by the end segments 78b and 82b only at the apex of the projections thereof. Such contact points are adjacent the segments 79b and 81b at the junction of the taper with the flat surfaces 97b and 98b of such end segments.

The strip S is progressively shaped into a Z cross section by the pairs of roll formers 46c (FIGURE 4), 46d (FIGURE 5), 46e (FIGURE 6), 46f (FIGURE 7), 46g (FIGURE 8), 46h (FIGURE 9) and 46i (FIGURE 10) as the strip S progresses from one set of roll formers to the next through the roll forming apparatus.

In the arrangement illustrated in these drawings, it is noted that each of the segments of a pair of the roll formers is the same as another of the roll formers. For example, the roll formers segments 78a–i and 82a–i are the same. Similarly, the roll former segments 79a–i and 81a–i are the same. In addition, the central portions 77a–g and 80a–g are the same but are reversed in position. Thus, by reversing the parts 79a–i and 82a–i and providing the central member opposite the direction of bending with sufficient bearing surface adjacent these members, and by providing the desired width of the central members 77a–g and 80a–g instead of a Z configuration, a C, U, or channel configuration can be formed.

In using the roll formers in ovens and particularly at elevated temperatures, for example within the range of 1100° F. to about 1500° F., the work surfaces of the central segments 77a–g and 80a–h are undercut or relieved, as indicated in FIGURE 2B at 95a–h and 96a–h, respectively. Adjacent the end of each of the roll segments 77a–g and 80a–g, respectively, is provided a bearing surface 97a–g and 98a–g for supporting bending of the edges of the strip as illustrated.

Thus, as the metal alloy strip S passes between the roll formers a minimum amount of contact is made by the roll formers with the strip S thereby assisting in maintaining the roll formers cool particularly at elevated temperatures.

Figure 11:
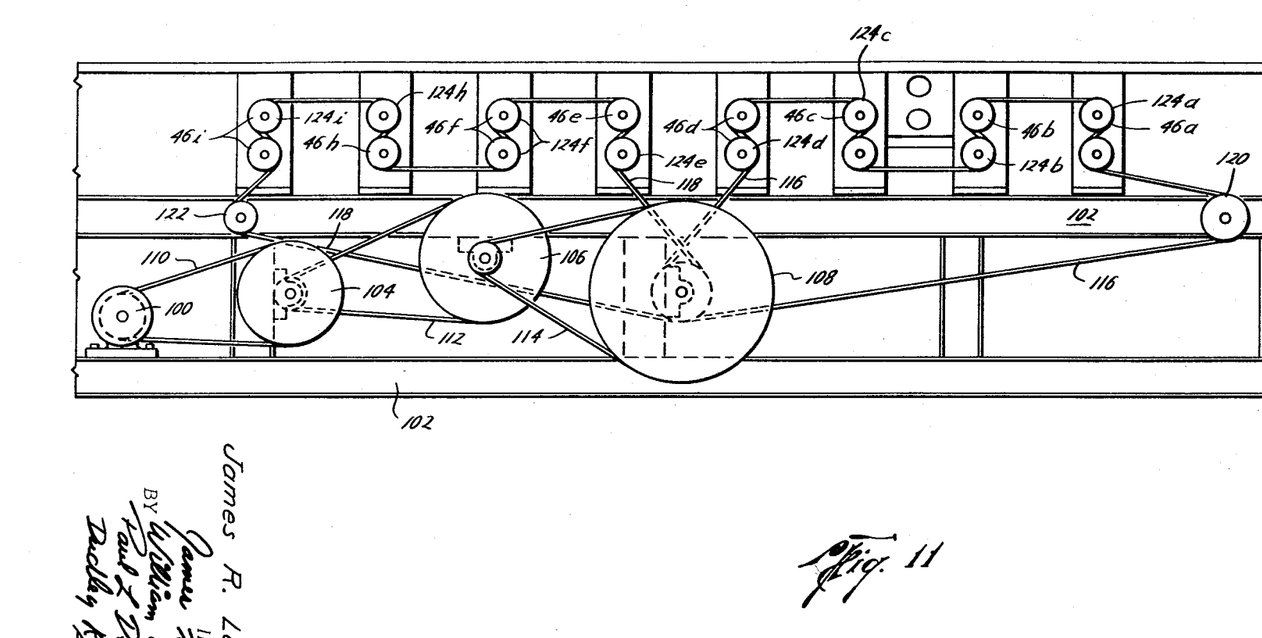
FIGURE 11 is a side view of the roll forming apparatus of FIGURE 1, illustrating the power drive for the pairs of roll formers.

The drive for the pairs of rolls 46a–i, with the exception of the idler rolls 46g which are not driven, is illustrated in FIGURE 11 to which reference is now made. A variable speed motor 100 is variably mounted on the frame member 102 as are the reduction gears 104, 106 and 108 which are driven by the belts 110, 112 and 114, respectively, from the motor 100. A pair of gear chains 116 and 118 are driven by the reduction gear 108 and extend over the idler gears 120 and 122, respectively, and mesh with and drive the gears 124a–i which drive their corresponding roll formers, as illustrated.

Thus, each of the roll formers are driven at the same rate of speed as the remainder of the roll formers, with the exception of the idler roll formers 46g which are not power driven. Any desired motor 100 may be utilized, however, a 25 HP variable speed motor has been found satisfactory.

Since any desired drive for the pairs of roll formers may be utilized, no more description thereof is given or deemed necessary.

In operation and with reference to FIGURE 1, strip material to be formed into a desired structural configuration is fed into the guide inlet 44 on to the guide 46 and to the first pair of roll formers 46a. As best seen in FIGURE 2b, 3, 4, 5, 6, 7, 8, 9 and 10, the metal strip S is progressively formed into a Z and it emerges and is discharged from the structural configuration oven 14 through the outlet 50. It is noted that in FIGURE 10, the outer sides of the strip are bent inward slightly, however, they spring back to form sides generally at 90° to the central portion of the strip S.

As previously mentioned, if it is desired to change the size or shape of the structure configuration being formed from the strip material, it is only necessary to rearrange the roll former segments. Thus, Zs, Cs, Us, channels and the like of various sizes may be made with a minimum of parts and without having roll formers which can be only used for one pass and for one size of structural configuration. This is highly advantageous and an important aspect of the present invention.

The oven arrangement illustrated in FIGURE 1 is particularly advantageous in that the products of combustion heating the fire tube 26 do not directly impinge the metal alloy strip thereby avoiding hydrogen embrittlement and excessive scaling, as previously mentioned.

Also, as previously mentioned, the roll forming apparatus may be utilized in forming strip materials into structural configurations which do not require heat treatment and hence, do not require an oven. The roll formers of the present invention, however, are particularly adapted for use in ovens and particularly for forming at relatively high temperatures in that they can be cooled and have a minimum of surface in contact with the heated metal strips being worked.

The present invention, therefore, is well suited and adapted to attain the objects and ends and has the advantages and features mentioned as well as others inherent therein.

While presently-preferred examples of the invention have been given for the purpose of disclosure, changes in details, arrangement or parts may be made which are within the spirit of the invention as defined by the scope of the appended claims.

What is claimed is:

1. A roll former for shaping a metal strip into a structural configuration such as a Z, C, U, channel or the like comprising,
    first and second shafts supported in spaced, parallel relation,
    a plurality of roll segments releasably mounted on each said shaft,
    at least one of the roll segments on the first shaft having a radial, annular projection tapering to an apex, and
    at least one of the roll segments on the second shaft having a radial, outwardly facing annular recess, said recess tapering to a flat innermost surface and forming a shaping and bearing surface to contactably receive the metal strip, the metal strip being contacted also by the projection of the roll segment of the first shaft but only by the apex of said projection at a point adjacent to the junction of the taper with the flat innermost surface of the recess of the roll segment on the second shaft.

2. The invention of claim 1 wherein at least a portion of one of the roll segments on each shaft is relieved radially so as to be spaced from the strip material being worked.

3. The invention of claim 1 including,
    means for circulating cooling fluid through the first and second shafts.

4. The invention of claim 1 including,
    additionally, at least a portion of one of the roll segments in each shaft is relieved radially so as to be spaced from the strip material being worked, and means for circulating cooling fluid through the first and second shafts.

References Cited

UNITED STATES PATENTS

| | | | |
|---|---|---|---|
| 1,996,500 | 4/1935 | Adams | 72—201 X |
| 3,355,922 | 12/1967 | Utashiro et al. | 72—181 X |
| 2,176,115 | 10/1939 | Yoder | 72—181 |
| 2,248,088 | 7/1941 | Kane | 72—181 |
| 2,471,490 | 5/1949 | Mercer | 72—181 X |
| 3,051,214 | 8/1962 | Rutten | 72—181 |
| 3,107,718 | 10/1963 | Ruple | 72—182 |
| 3,251,210 | 5/1966 | Werntz | 72—181 |
| 3,251,211 | 5/1966 | Harris | 72—180 |

FOREIGN PATENTS

| | | |
|---|---|---|
| 299,210 | 7/1932 | Italy. |
| 144,151 | 2/1954 | Sweden. |

MILTON S. MEHR, Primary Examiner

U.S. Cl. X.R.

72—201